US008500029B2

(12) United States Patent
Wien

(10) Patent No.: US 8,500,029 B2
(45) Date of Patent: Aug. 6, 2013

(54) TIME MANAGEMENT SYSTEM AND VALUE BAR CODE

(76) Inventor: Abraham Wien, Miami, FL (US)

(*) Notice: Subject to any disclaimer, the term of this patent is extended or adjusted under 35 U.S.C. 154(b) by 27 days.

(21) Appl. No.: 13/219,663

(22) Filed: Aug. 27, 2011

(65) Prior Publication Data

US 2013/0048736 A1 Feb. 28, 2013

(51) Int. Cl.
*G06K 19/02* (2006.01)
(52) U.S. Cl.
USPC ...... 235/488; 235/383; 235/385; 235/462.01; 235/494
(58) Field of Classification Search
USPC ............... 235/375, 383, 385, 462.01, 488, 235/494
See application file for complete search history.

(56) References Cited

U.S. PATENT DOCUMENTS

| | | | |
|---|---|---|---|
| 3,042,264 A * | 7/1962 | Trumbuil et al. ............. 222/142 |
| 3,983,389 A | 9/1976 | Cowardin |
| 4,086,477 A | 4/1978 | Cowardin |
| 4,272,675 A | 6/1981 | Blanford |
| 4,354,101 A | 10/1982 | Hester |
| 4,414,468 A | 11/1983 | Laurer |
| 4,421,978 A | 12/1983 | Laurer |
| 5,124,538 A | 6/1992 | Lapinski |
| 5,262,626 A | 11/1993 | Goren |
| 5,442,164 A | 8/1995 | Adachi |
| 5,457,308 A | 10/1995 | Spitz |
| 5,495,097 A | 2/1996 | Katz |
| 5,548,107 A | 8/1996 | Lapinski |
| 5,667,303 A * | 9/1997 | Arens et al. .................... 374/102 |
| 5,821,519 A | 10/1998 | Lee |
| 5,930,206 A * | 7/1999 | Haas et al. ..................... 368/327 |
| 6,544,925 B1 * | 4/2003 | Prusik et al. .................. 503/201 |
| 6,723,285 B2 | 4/2004 | Chen |
| 7,057,495 B2 * | 6/2006 | Debord et al. ........... 340/309.16 |
| 7,416,122 B2 * | 8/2008 | Sato .............................. 235/385 |
| 7,808,861 B2 | 10/2010 | Wien |
| 2003/0235119 A1 | 12/2003 | Wien |
| 2008/0043804 A1 * | 2/2008 | Goldsmith et al. ........... 374/106 |
| 2009/0301382 A1 * | 12/2009 | Patel ............................. 116/201 |
| 2010/0012018 A1 * | 1/2010 | Ribi .............................. 116/207 |
| 2010/0149929 A1 * | 6/2010 | Braunberger ................. 368/223 |
| 2010/0209521 A1 | 8/2010 | Schalkhammer |
| 2010/0263244 A1 | 10/2010 | Tabirian |
| 2011/0174887 A1 | 7/2011 | Johnson |

* cited by examiner

*Primary Examiner* — Tuyen K Vo
(74) *Attorney, Agent, or Firm* — KB Patents; Luca D'Ottone

(57) ABSTRACT

They object of the present invention is an TIME MANAGEMENT SYSTEM that integrates a static barcode together with a TIME VARIABLE label referred as TIME VALUE BAR or TVB. The TVB is then linked via a database to product information that vary with time such as useful shelf life, remaining shelf life, price, identity, and expiration of the article. The information is input, stored, linked, output, and managed by a Central Processing Unit (CPU), but it is also partially available to the public via the TVB. In one of the preferred embodiments of the invention the variable bar code system is compatible with the Universal Product Code (UPC) currently in use in most retail shops. In another embodiment the TIME VALUE BAR of the present invention relates a 3D barcode with a VARIABLE TIME label effectively adding a fourth dimension to the barcode thus becoming a 4D barcode system.

16 Claims, 12 Drawing Sheets

(a)

(b)

FIG. 4
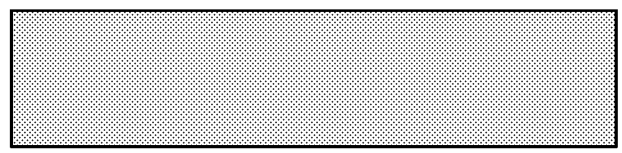
FIG. 4(a)
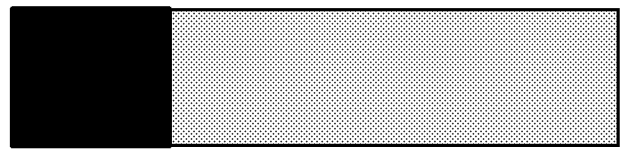
FIG. 4(b)
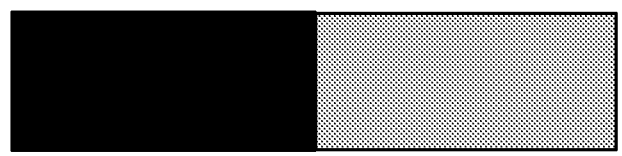
FIG. 4(c)
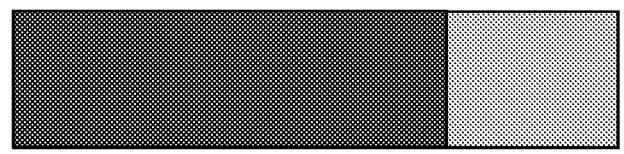
FIG. 4(d)
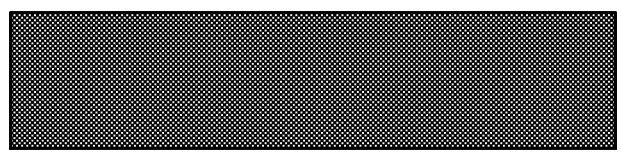
FIG. 4(e)

FIG. 5
FIG. 5(a)
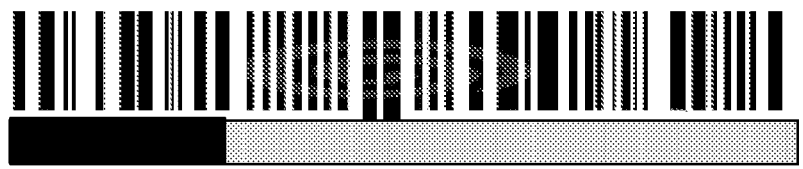
FIG. 5(b)
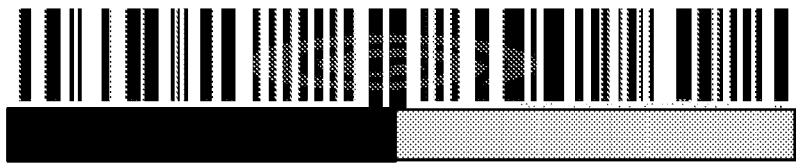
FIG. 5(c)
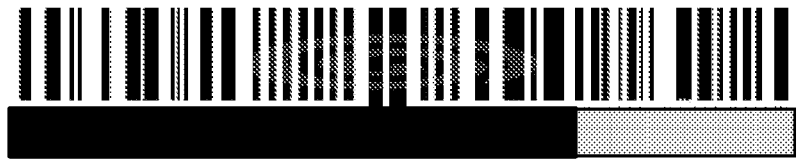
FIG. 5(d)
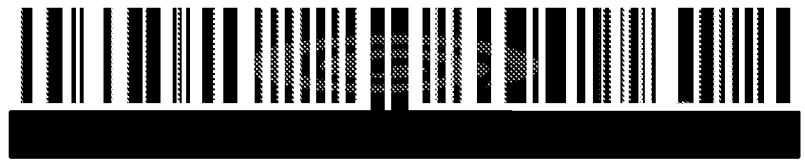
FIG. 5(e)

FIG. 7
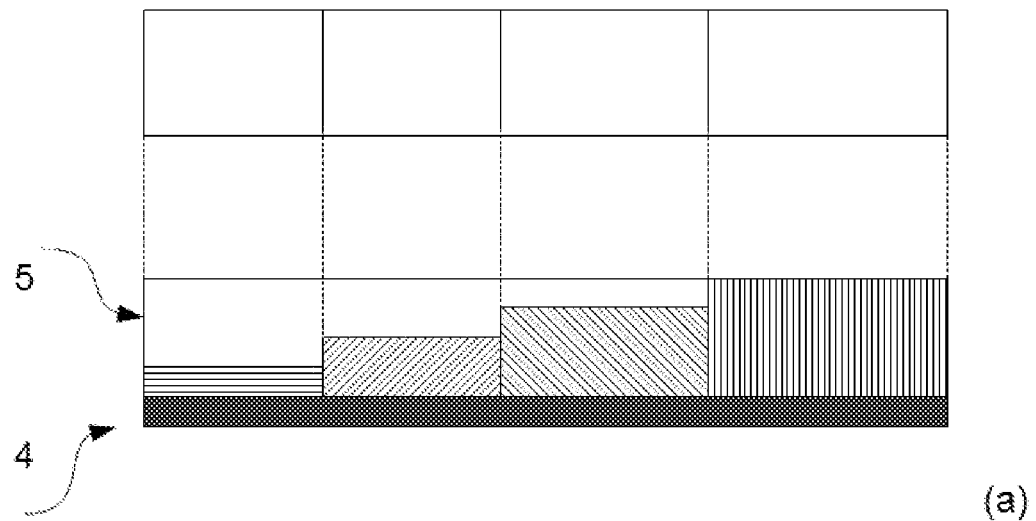
(a)
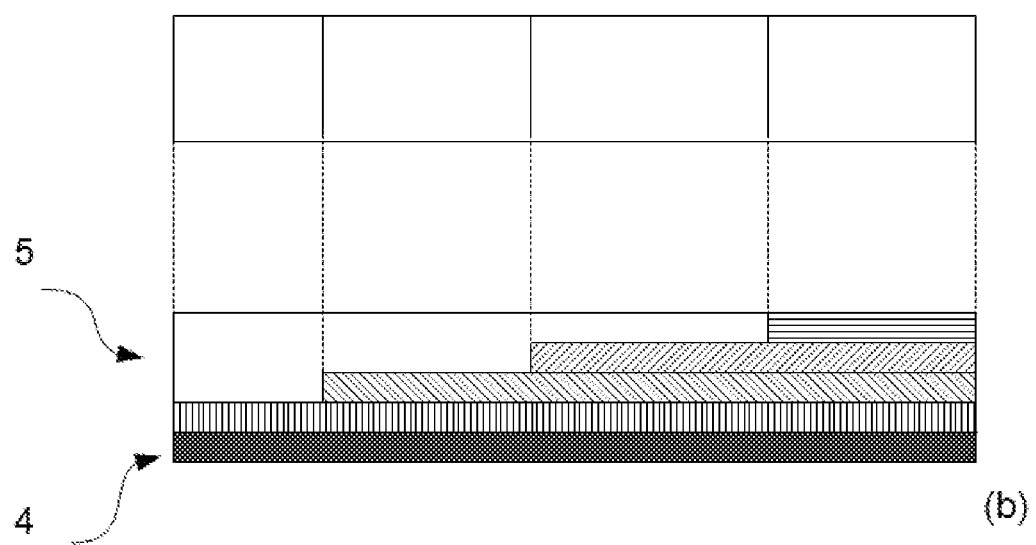
(b)

FIG. 8
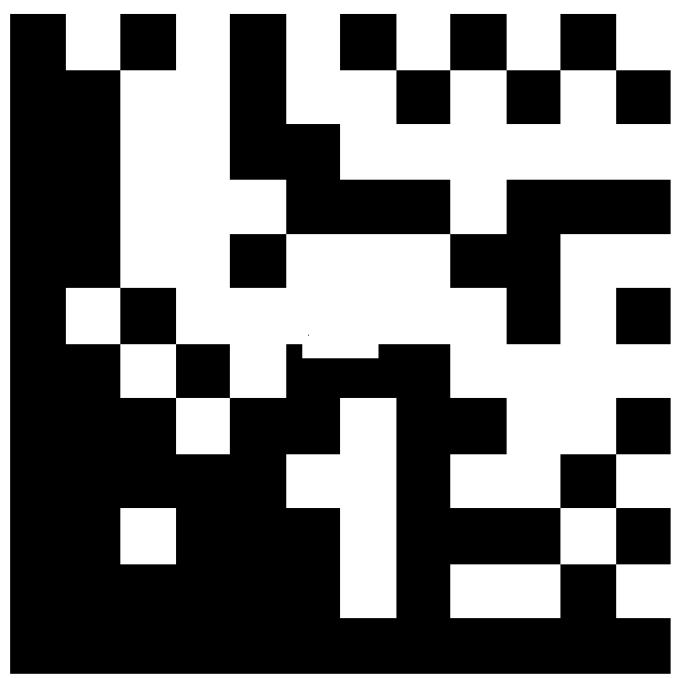
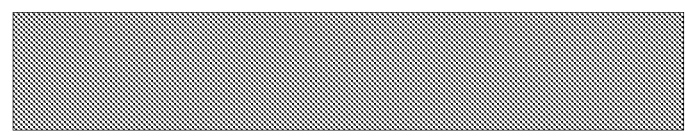

FIG. 9
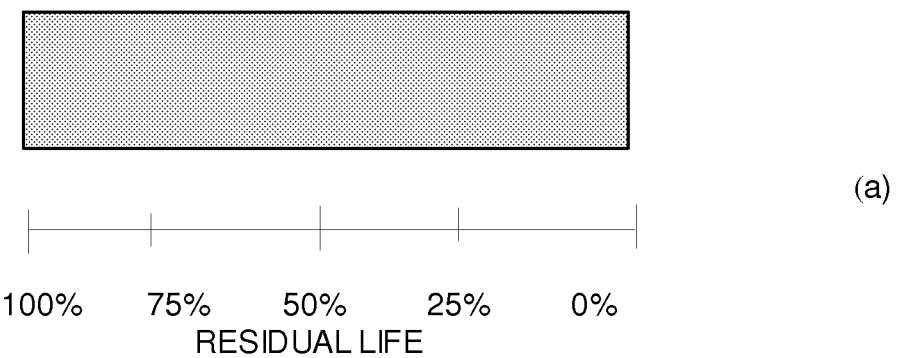
(a)
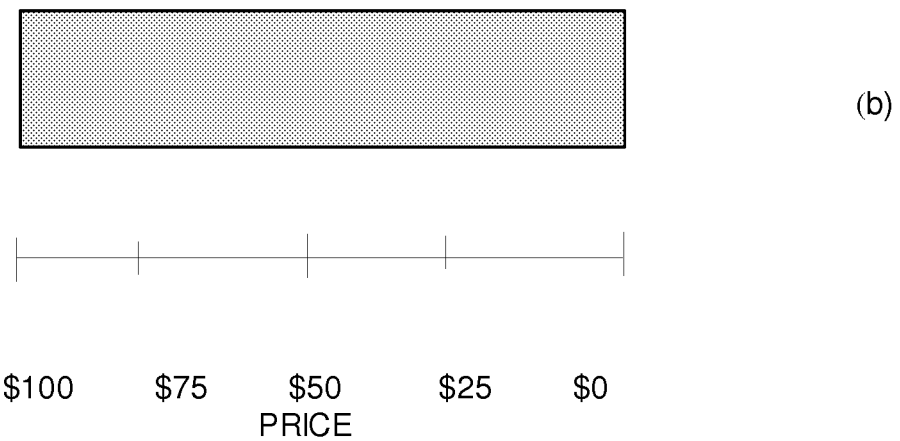
(b)

FIG. 12
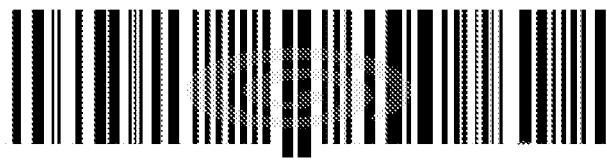
100%    75%    50%    25%    0%
RESIDUAL LIFE

TIME MANAGEMENT SYSTEM AND VALUE BAR CODE

BACKGROUND OF THE INVENTION

The object of the present relates to bar codes, and, more particularly, to enhancing static barcodes through the addition of a TIME VARIABLE component referred as TIME VALUE BAR (TVB). By keeping track of the time the system of the present invention improves over static barcodes and overcomes the limitations inherent with the prior art with the overall goal of ensuring a better protection for the public in terms of providing useful, and often not disclosed information regarding the useful life and freshness or the economic life of an article or product. The combination of a TIME VARIABLE component with a 3D barcode effectively introduces a 4D barcode where the fourth dimension is represented by the time.

BRIEF DESCRIPTION OF THE PRIOR ART

Bar Codes are commonly known in the art. George J. Laurer first patented a Wand for reading optically encoded symbols in 1976. From Laurer's initial work several different patents span off most of which are listed in the Information Disclosure Statement (IDS) that is an integral portion of the present application. On the other hand to the best knowledge of the inventor no one address the issue of having the bar code of a product tied up with an expiration date or with another kind of indicator for freshness, useful shelf life, or shelf life.

U.S. Pat. No. 3,983,389 to Covarding and Laurer first discloses and claims a wand suitable for scanning the universal product code (UPC) symbol uses a light emitting diode for illuminating the symbol and a silicon photodetector for receiving the reflected energy. In the Covarding and Laurel patent disclosure a single optical fiber is coupled to the diode and to a portion of a second single fiber for conducting narrow bandwidth visible light centered about 6,500 A to the terminus of the wand.

U.S. Pat. No. 4,086,477 to Covarding and Laurer is also generally directed to bar codes and it discloses and claims a method and circuit for decoding coded electric signals from a scanner reading a coded label such as the Universal Product Code (UPC) label, establishes a plurality of counting gates based on a predetermined sequence of discrete signal transitions and counts a plurality of related pulse frequencies during the gating periods under control of the established counting gates.

The Covarding and Laurer patent mentioned above first introduced a bar code that is used to associate information to a product for the use in department or grocery stores. On the other hand these patents do not address or resolve the issue that information may change over time. For example a specific bushel of lettuce expires within a few weeks from display in a grocery store, but its bar code as currently used in stores would still reflect full price on the item as if it was a brand new perfectly fresh bushel of lettuce. This limitation can be extended to most if not all patents by Covarding and Laurer dealing with bar codes.

More recently the problem of making the information regarding the freshness of a product available to the public, or to a specific user has been addressed by three U.S. Published Patent Applications: U.S. Published Patent Application 2010/0263244 to Tabirian et al., directed to Lables and Tagants with Programmable Nulti Color Coded Timing; U.S. Published Patent Application 2010/0209521 to Shalkhammer directed to Sensory Pigments used on Food, Packaging, Paper, and Pharmaceutical, and Electronic Products; and U.S. Published Patent Application 2010/0149929 to Braunberger directed to a Time Dependent Temperature Independent Color Changing Label.

While these three patent applications collectively address the issue of making available to store managers and to the public in general important information regarding the residual shelf life of an article, they do not address or resolve in any way the specific problem solved by the object of the present invention, that is to provide a tool to manage inventory over time and to make information available to the public and/or to a specific user via a coded set of printed indicia or, as in one of the preferred embodiments of the present application, by means of combining a bar code with a TIME VARIABLE component.

Finally U.S. Published Application 20110174887 to Sarella Ann Johnson directed to a "Blood Type Color Coding" disclose a method to identify the different blood types with a specific color or color combination. At the present time blood types are identified by symbols, bar codes or other apparatus only in one color. Fatalities due to wrong blood type transfusion have increased yearly. Under the teachings of the Sarella Ann patent application blood type Color Coding will allow a more direct way of identifying blood types enhancing the check and balancing regulated assessment and decreasing the possibility of error.

Other patents and patent applications describe various attempts to provide for a system that changes the information relative to an article over time, but to the best knowledge of the inventor no one provides for a variable bar code system as the one presented in the present application. Hence, despite all the efforts listed above, prior art patents describe structures that are either not truly convenient or else involve complicated, expensive, and overly difficult to operate parts and procedures. Other devices have been advertised on various media but never patented or described into a printed publication.

SUMMARY OF THE INVENTION

The present application discloses and claims a TIME MANAGEMENT SYSTEM (TMS) that relies on the combination of barcode technology with a TIME VARIABLE component. The label thus obtained is referred to as a TIME VALUE BAR (TVB). The TVB is then integrated in a time management system that provides for an effective way to keep track of the value or the shelf life of an article or product.

In a first preferred embodiment of the present invention the system relies on a special label having two components: a first component and a second component. Said first component does not changes over time and it is referred as TIME INVARIABLE. Said first TIME INVARIABLE component is generally a label, bar, or wand that is encoded, and its display is linked to invariable information regarding that product such as origin, manufacturer, and the like.

Generally speaking the TIME INVARIABLE component of the TVB of the present invention displays printed indicia in the form of a barcode.

Said second component varies over time and it is referred as TIME VARIABLE component. Generally speaking the TIME VARIABLE component is a label, bar or wand that has various aspects to it. The first aspect is that it changes over time its display. The second aspect is that the information that carries is clearly legible to the public. The third aspect is that that it may display coded information such as a linear barcode, a 2D barcode, a 3D barcode, or as in this case a $4^{th}$ D barcode where the fourth dimension is represented by the time.

In fact, in one of the preferred embodiments of the present invention said TIME VARIABLE component is also encoded such that the changes over time in the useful life of a product can be retrieved via a scanner or other equivalent device. In a separate embodiment of the TIME VARIABLE component of the present invention displays a set of printed indicia relating the degree of change in the label to the passing of the time.

In one of the preferred embodiments the TIME VARIABLE component displayed to the public, and, associated with the bar code label of the present invention, is a clear and concise way to intuitively represent the correlation between the original price of the article and the price at the time of the observation. This can be done, for example with the help of a visual display where the full price is associated with time zero and a minimal residual price is associated with the end of the shelf life of the article.

In this way the consumer has the ability to track the price of various items according the decreased residual life of the product. Intuitively as time passes the article or product becomes older, and its residual life gets shortened so the price drops accordingly. Other algorithms that relates price and residual shelf life may apply.

In one of the preferred embodiments the printed indicia displayed on the TVB of the present invention is compatible with the Universal Product Code (UPC) currently in use in most retail shops and commercial products.

By combining two components the TVB label of the present application displays both basic information regarding the product such as its identity and origin, and information that depends on time such as residual shelf life, expiration date, price, residual nutritional information, and the like thus overcoming the limitations inherent in the prior art. The encoded information can be retrieved via optical scanner, smart phones, or other similar device. Clear information is displayed for the public to see, and understand with the naked eye and/or without the use or help of any of the devices mentioned earlier since its display is designed to be clear, intuitive, and easy to understand.

It is then the principal object of the present invention to provide for a TIME MANAGEMENT SYSTEM (TMS) to be used in retail stores, storage facilities, warehouses, commercial product's factories and other alike, that links the information displayed on a set of encoded printed indicia, such as a bar code, with different properties of an item some of which are invariable such as identity, origin, and manufacturer, and other ones are variable such as price, nutritional values, shelf life, and the like to protect and inform the end user and the public at large.

The TIME MANAGEMENT SYSTEM of the present invention finds additional application in factories, warehouses, storage facilities, commercial products, retail stores, and more in general in any place that store items that are associated with an expiration date and that are time sensitive for commercial applications.

In one preferred embodiment of the present invention the issue of linking both a TIME VARIABLE AND A TIME INVARIABLE sets of information to an item is then resolved by the integration of a TIME VALUE BAR into the claimed TIME MANAGEMENT SYSTEM. Said TVB is a special label.

EXAMPLE NUMBER 1 if a merchant displays a bushel of lettuce for sale at grocery store as time pass the shelf life of the lettuce diminishes while its basic identity, and its origin stay the same. The invariable information is associated with the TIME INVARIABLE component of the bar while the TIME VARIABLE information is in the display of the TVB disclosed in the present application. While time passes, the TIME INVARIABLE portion of the label retains the invariable set of information regarding the article, and the TIME VARIABLE portion changes its display conveying to the purchaser an intuitive way to relates the article to its shelf life and potentially to its price or other parameters associated with the passing of the time and shelf life.

It is a secondary objective of the present invention to provide for an expiration date or lapsed time of the useful life of the product added to a bar code. This expiration date encompasses different set of information triggering subsequent actions such as lowering the price, return the item to the manufacturer, remove from shelves, and the like. It is an additional objective of the present invention to provide for a pricing method that is easy to read and understand by the consumer and enhances product's safety.

It is a final objective of the present invention to provide for an integrated pricing method based on the shelf life of an article that is inexpensive to put in place and convenient to implement.

These and other objectives achieved by the device of the present invention will be apparent by the drawings, by their detailed description, and by the specification here from appended.

BRIEF DESCRIPTION OF THE DRAWINGS

FIG. 4 is a pictorial representation of the TIME VARIABLE component integrated into said TIME MANAGEMENT SYSTEM of the present invention. The gray area represents the initial color while the darker area represents the coloration taken by the label at the expiration of a certain time. The gray area of FIG. 4 can represents a plain optical indicator easy to read for the public. FIG. 4(a) shows a label corresponding to 100% of the shelf life of the article. As time pass the variable label discolor, or more generally change in coloration. FIG. 4(b) shows a label where about 25% of the shelf or useful life of the article or product is expired and 75% is remaining. FIG. 4(c) shows a label where 50% of the shelf life of the article lapsed and 50% is remaining. FIG. 4(d) shows a label where about 75% of the shelf life of the article is expired and 25% is remaining. FIG. 4(e) shows a label where the remaining shelf life of the article is null.

FIG. 5 is a pictorial representation of the combined TIME INVARIABLE and TIME VARIABLE components integrated in the TIME MANAGEMENT SYSTEM of the present invention. In the Figure the upper portion of the display is represented by the TIME INVARIABLE component: namely a barcode that is linked to a set of information stored in said first database that can be retrieved via various means. The lower portion is the TIME VARIABLE component where the the darker area represents the new coloration taken by the label at the expiration of a certain time. FIG. 5(a) shows a label corresponding to 100% of the shelf life of the article. As time pass the variable label discolor, or more generally change in coloration. FIG. 5(b) shows a label where about 25% of the shelf or useful life of the article or product is expired and 75% is remaining. FIG. 5(c) shows a label where 50% of the shelf life of the article lapsed and 50% is remaining. FIG. 5(d) shows a label where about 75% of the shelf life of the article is expired and 25% is remaining. FIG. 5(e) shows a label where the remaining shelf life of the article is null. In this way while all important information remain encoded and available for scanning in the barcode, the price versus time information is intuitively delivered to the user by the TIME VALUE BAR. The information on the TIME VALUE BAR is also scanneable and can be read and detected optically.

FIG. 7 is a detail of the cross sectional view of the TIME VARIABLE portion of the barcode label of FIG. 6. The layer portrayed in FIG. 7 are respectively (4) and (5) shown in FIG. 12. A chemicals embedded layer composed by absorbent material (4) and a permeable (filter) layer (5). As in FIG. 6 the label is subdivided in four segments corresponding respectively to intervals of freshness comprised between 100-75%, 74-50%, 49-25%, 24-0%. It is clear and obvious that the number of intervals in which the label is subdivided can be changes as required by the convenience of the user. The bottom layer is impregnated with a color changing chemical. The chemical changes color when it gets in touch with an atmospheric component such as Oxygen, Carbon Dioxide, pH changing chemicals and so on. On top of the bottom layer impregnated with the color changing chemical there are various filters, herefrom collectively referred as permeable or filter layer of the label. Said filters regulate the time a specific atmospheric component can reach the layer containing the color changing chemical. Filters can be applied in parallel one with each other such as in FIG. 7(a) this is the case for example of filters having different densities, or additively one on top of the other such as in FIG. 7(b) this is the case of filters having the same density and the various different times employed by oxygen to reach the bottom layer depends on the thickness of the layers. The balance of the filter is inert material. The filtering system allows for different pre set time to allow oxygen into the layer containing the color changing chemical ultimately resulting in different darkening times for each segment. In this way they progressively change color in a neat and clean way, readable by a scanner.

FIG. 8 is a pictorial representation of one preferred embodiment of the TIME VALUE BAR of present invention integrated with a 3D bar code. The gray bar in the lower position represent the TIME VARIABLE component of the TIME VALUE BAR while the 3D barcode represents the TIME INVARIABLE one. By adding the time perspective to the three physical dimensions the barcode of FIG. 8 effectively represents a kind of a 4D barcode.

FIG. 9 is a pictorial representation of the TIME VARIABLE component of the TVB disclosed in the present application associated with a scale representing the residual life or the article or product (a) or the change in price (b)

Below the exterior protective layer 22, is a protective membrane 24, which may be a clear or opaque plastic cover that is also porous and allows for light and/or oxygen to activate the chemical component 26 as well as to keep the chemical component 26 as previously described, in place.

Figure 10:
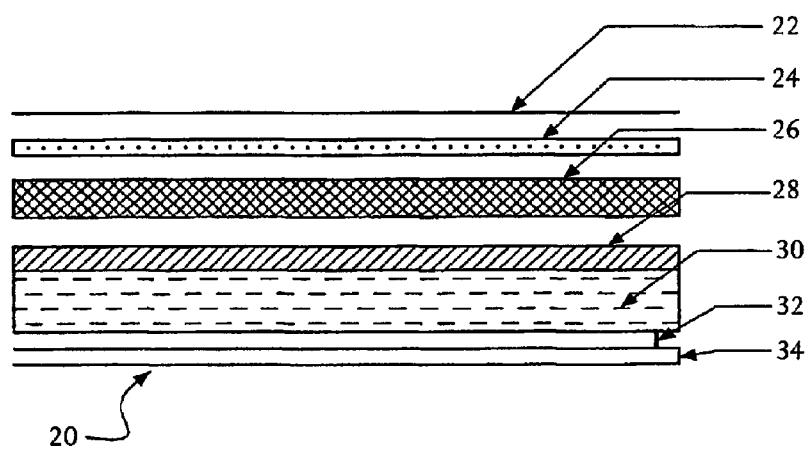
FIG. 10 represents the prior art disclosed and claimed by the commonly own Wien Patent. Namely the one embodiment 20 of the Wien expiration date system includes an exterior protective layer 22 made of conventional metallic foil, polymeric coatings, or other similar protective materials that the consumer may remove to activate the chemical component in accordance with the present invention.

The embodiment of the Expiration Date System shown in FIG. 10 includes a dissolvable gel 28 and a layer of detectors 30. The dissolvable gel 28 is made from water dissolvable polymers as shown above.

The embodiment 20 of the Wien Patent reproduced in FIG. 12, also includes a conventional plastic backing 32 to provide support for the other components of the expiration date system of the present invention. Under the teachings of the Wien patent said plastic backing 32 may be secured in a removable or more permanent fashion by use of one or more conventional adhesives 34 to secure the device 20 to a conventional container in accordance with the present invention.

Figure 11:
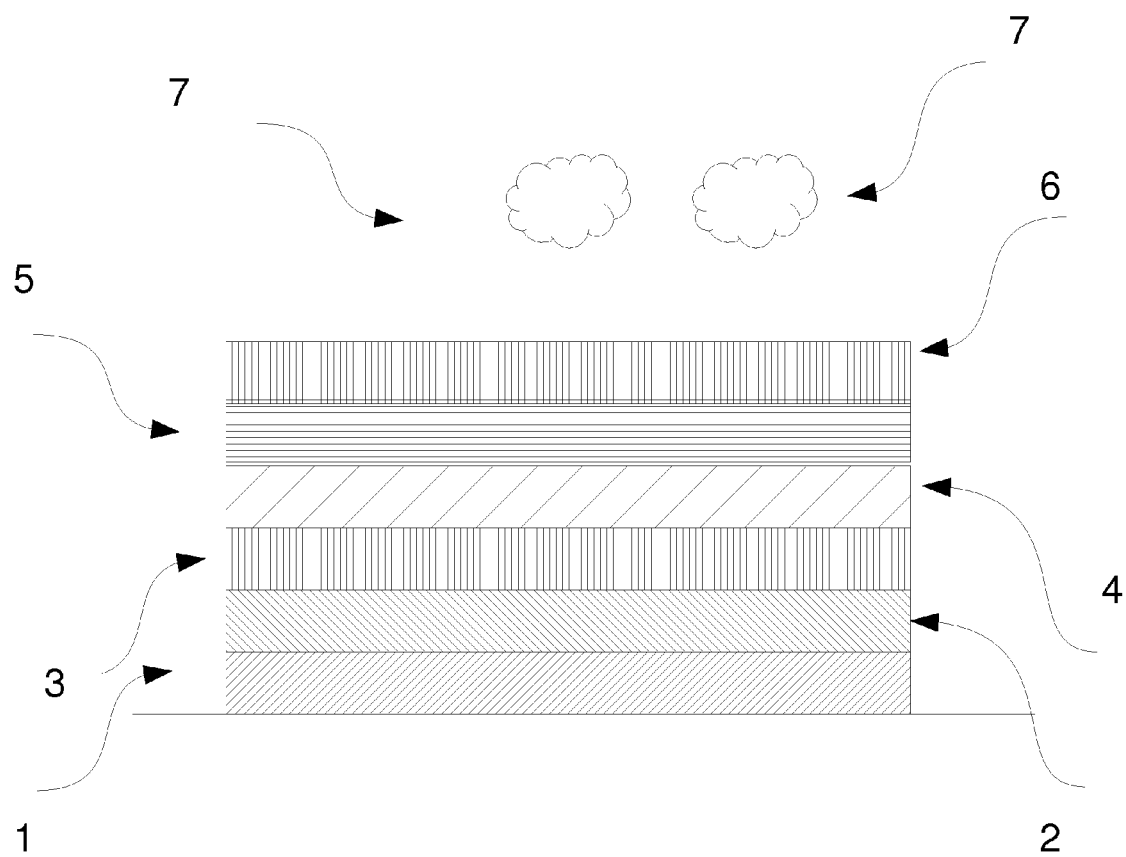

FIG. 11 represents a cross sectional view of the TIME VARIABLE component of the TVB disclosed and claimed in the present application.

FIG. 12 represents one of the preferred embodiments of the present invention where the printed indicia of both the VARIABLE TIME and the INVARIABLE TIME components of the special label display a barcode. In this pictorial representation the VARIABLE TIME component displays a residual shelf life of about 50%.

DESCRIPTION OF THE PREFERRED EMBODIMENT

Figure 1:
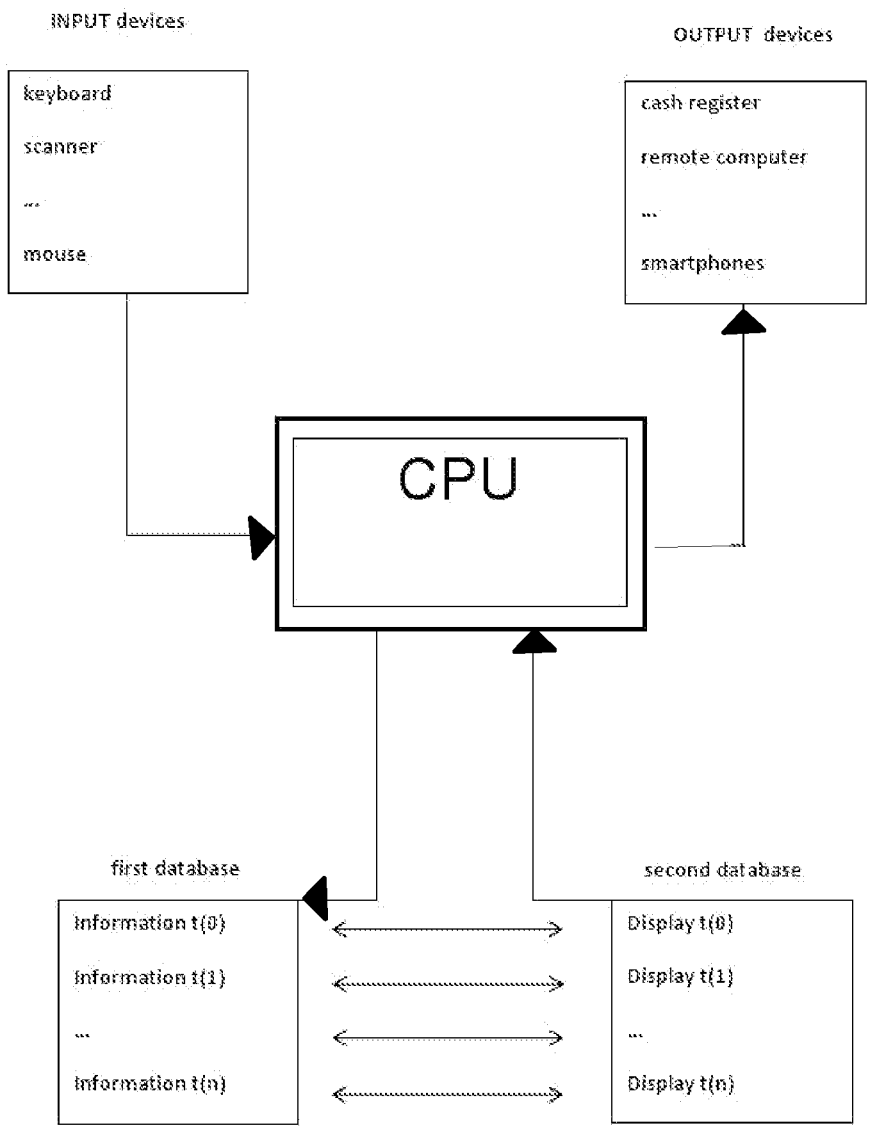
FIG. 1 is a diagram representing the functional elements of the TIME MANAGEMENT SYSTEM (TMS) of the present invention, namely: a Central Processing Unit (CPU), a plurality of INPUT devices, a plurality of OUTPUT devices, a plurality of connections to link the CPU to said INPUT and OUTPUT devices, a first Database associated to said CPU, a second Database associated to said CPU, a computer software program to manage the information (not shown in the diagram). In the diagram the small cap letter t represents the time variable (i.e. t=time) and the various values within round parenthesis represent the various values of time (for example t=0 is represented as t(0) in the diagram). As the diagram is for illustration only the values of time should not be taken literally, rather, as in a math book should be interpreted as generic indication of the various values of time and the variables related to such as the information, the price, and the display on the time variable label.
Figure 2:
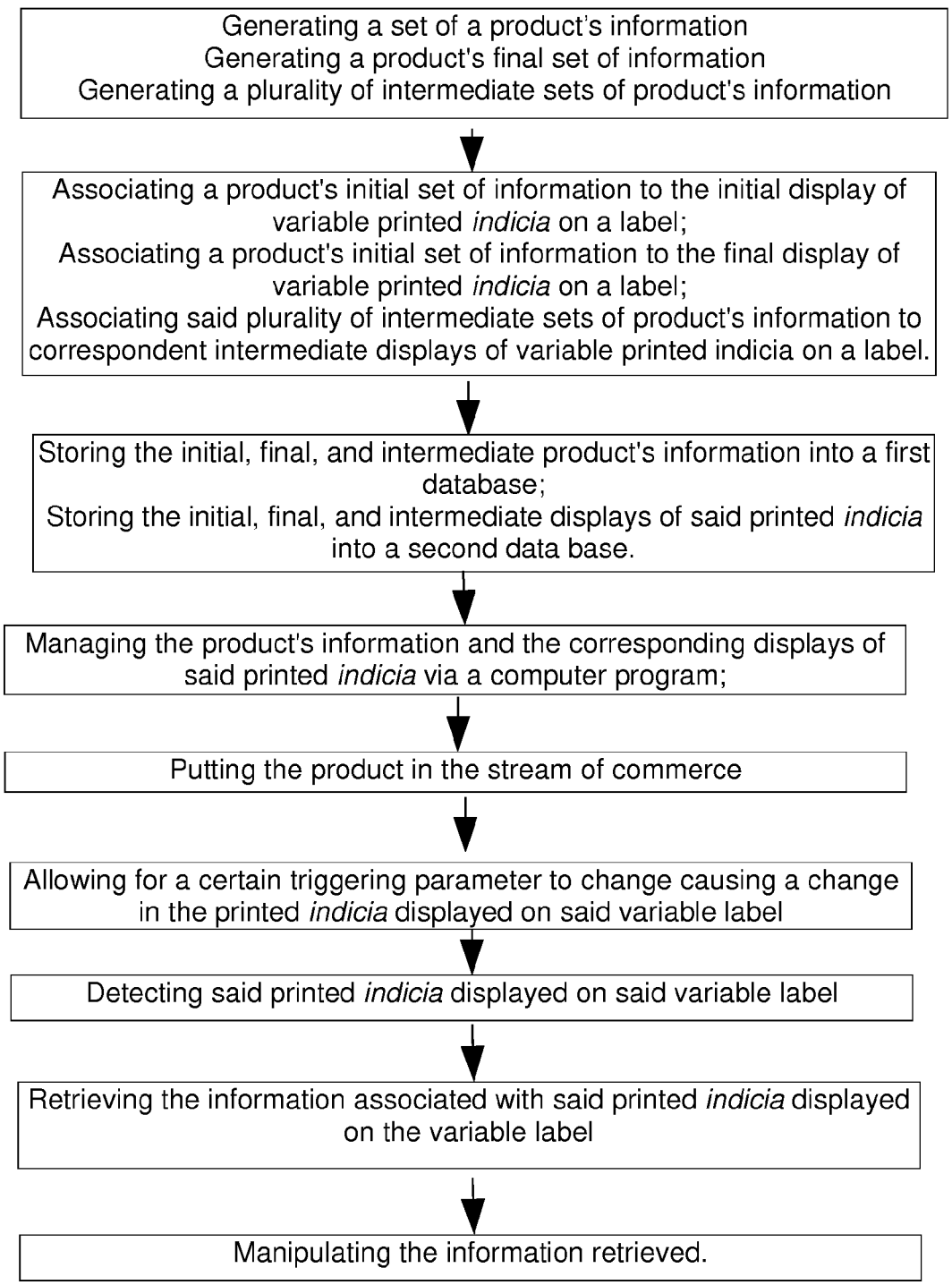
FIG. 2 is a flow chart representing the steps involved in the TIME MANAGEMENT SYSTEM (TMS), in accordance with the teachings of the present invention.
Figure 3:
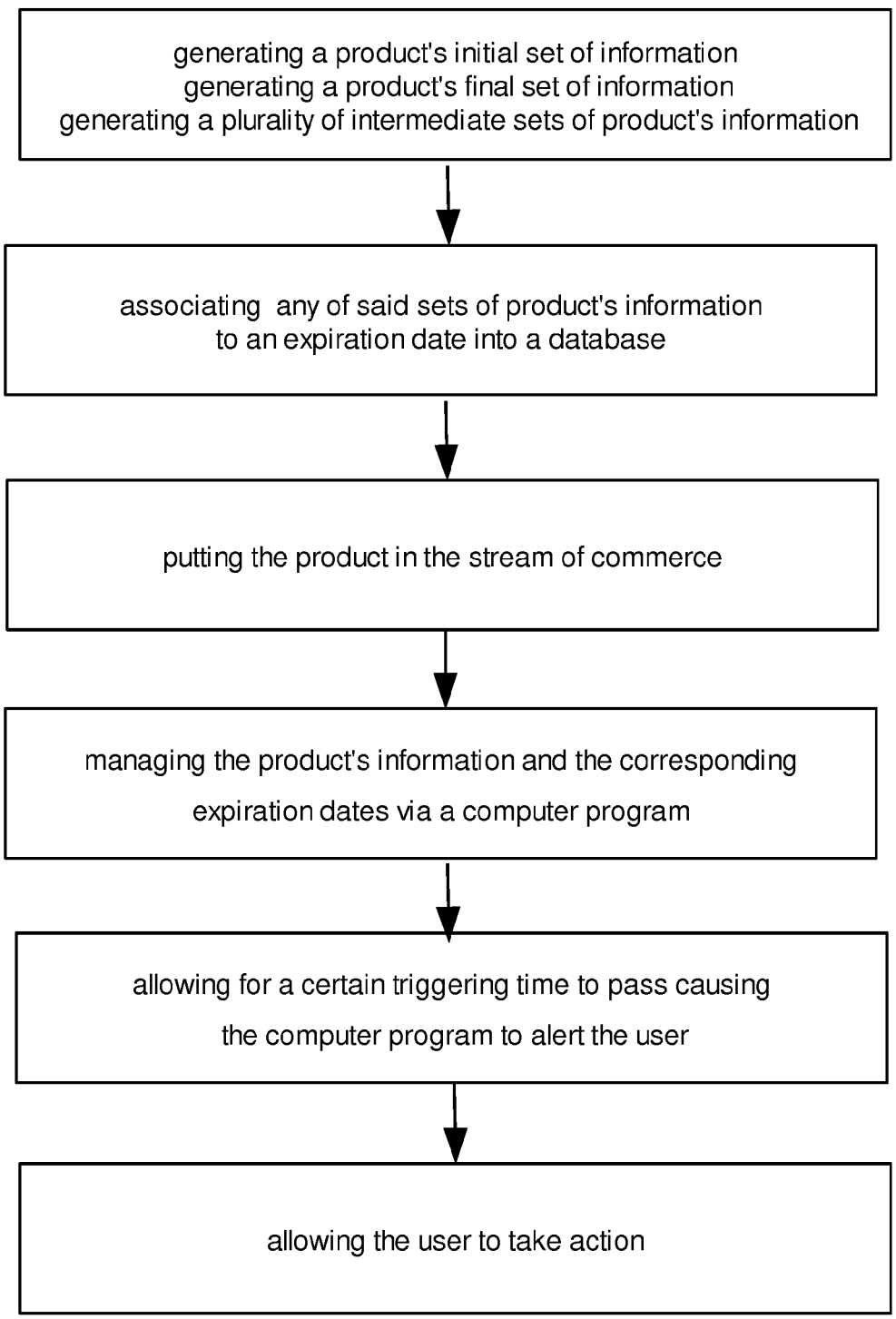
FIG. 3 is a flow chart representing the steps involved in an alternative embodiment of the TIME MANAGEMENT SYSTEM (TMS), in accordance with the teachings of the present invention.

As shown in FIGS. 1, 2 and 3 the object of the present invention is a Time management System (TMS). As shown in FIG. 2 in one of its preferred embodiments the TMS of the present application relies on a special label that integrates a barcode with a TIME VARIABLE component into a novel TIME VALUE BAR (TVB).

FIGS. 5, 8 and 12 show as said special label has both a TIME VARIABLE and a TIME INVARIABLE components. The component that does not vary with time displays a set of printed indicia representing a barcode. The component that in fact varies with time displays a set of printed indicia that can be readable with the naked eye as in in FIG. 5, or with the help of a scale as in FIG. 9, or scanneable as in FIG. 11.

Overall the TMS is a way of managing product's information, with specific reference to information that may vary due to various parameters such as time that affects the useful shelf life of an item.

The method to use the TIME VARIABLE component of the TIME MANAGEMENT SYSTEM of the present application comprises of the following steps: A) generating a product's initial set of information; B) generating a product's final set of information; C) generating a plurality of intermediate sets of product's information; D) associating a product's initial set of information to the initial display of variable printed indicia on a label; E) associating a product's initial set of information to the final display of variable printed indicia on a label; G) associating said plurality of intermediate sets of product's information to correspondent intermediate displays of variable printed indicia on a label; H) storing the initial, final, and intermediate product's information into a first database; I) storing the initial, final, and intermediate displays of said printed indicia into a second data base; L) managing the product's information and the corresponding displays of of said printed indicia via a computer program; M) physically affixing the variable label on the product; N) putting the product in the stream of commerce; O) allowing for a certain triggering parameter to change causing a change in the printed indicia displayed on said variable label; P) detecting said printed indicia displayed on said variable label; Q) retrieving the information associated with said printed indicia displayed on the variable label; R) manipulating the information retrieved.

The method to use the TIME INVARIABLE component of the TIME MANAGEMENT SYSTEM of the present application consists of the following steps: A) generating a product's initial set of information; B) generating a product's final set of information; C) generating a plurality of intermediate sets of product's information; D) associating any of said sets of product's information to an expiration date into a database; E) managing the product's information and the corresponding expiration dates via a computer program; F) putting the product in the stream of commerce; G) allowing for a certain triggering time to pass causing the computer program to alert the user; H) allowing the user to take action.

In one of the preferred embodiments of the instant invention the TMS incorporates a special label having two components: a component that varies with time, also referred as TIME VARIABLE component, and a component that does not vary with time also referred as TIME INVARIABLE component. The TIME VARIABLE component of said label displaying printed indicia are open and clear for the public to read but they can also be scanned and detected by an optical device. As shown in FIG. 9 the TIME VARIABLE component of the special label of the present invention can be associated with a scale representing the passing of the time, or any variable related to that.

The TIME INVARIABLE component of said label displays a barcode that can be a UPC compatible barcode linked to information stored into a database. The information linked to said invariable portion of the label includes both information that do not change or vary with time such as the identity of the product, its manufacturer, its country of origin and the like and information that change over time such as the freshness, the useful life as determined in current standards, the residual shelf life as determined in current standards, the price, and so on.

For the purpose of the present application shelf life is defined the length of time that perishable items or other articles or products that are time sensitive are given before they are considered unsuitable for sale or the have extinguished their active or nutritional contents. In some context the shelf life is worded as freshness or the like. Residual shelf life is a percentage of the original shelf life of one item: for example when produced the item has 100% of shelf life, meaning that its active ingredient, whether nutrients, active molecules, antioxidants, or the like are at their fullest potential. As time passes the shelf life of the item is diminished accordingly, so may be other info such as price, nutritional values, and the like. In general price is a variable that is tightly connected for various reasons to the shelf life of an article. The longer the shelf life the higher the nutritional content or freshness of an article.

For the purpose of the present application useful life has a broader meaning than shelf life and it is defined as the period during which an article or product that can even be an long lived item is expected to be usable for the purpose it was acquired. It may or may not correspond with the item's actual physical life or economic life. This extend the application of the TIME MANAGEMENT SYSTEM of the present invention to articles such as computers, clothes, and other items that do not loose freshness over time but that may become obsolete or inadequate.

For the purpose of the present application TIME VARIABLE and the related shelf life refers to the changes of the printed indicia physically printed on a special label using, for example the technology disclosed by Wien in US published application 20030235119 and U.S. Pat. No. 7,808,861. In this case the TMS is based on changes in the properties of the printed indicia displayed on the special label disclosed below. For example if a merchant wraps in plastic a bushel of lettuce, labels it with a special time sensitive label, and displays to the public, then the price and the freshness of that bushel will be reflected on the time sensitive label.

Initially values for freshness and nutritional content and their changes over time are determined and input into a database. Other information such as the price may be linked to reflect the changes in freshness and nutritional values. Once these values are established and stored into a first database, the displays of the variable label of the present invention are associated to the information so that for each display a unique set of information can be retrieved. In the case the merchant simply wants to lower the price after a set period of time the variable barcodes physically attached to the bushel of lettuce can change the displayed code and indicia to reflect that change respectively to the scanner and to the public.

The correlation between the passing of the time and the time and the decreased value or an article or product is somewhat intuitive, nevertheless as shown in FIG. 9(b) it can be enhanced by the use of scales represented by printed indicia affixed in correspondence of the different degree of time passed from the production or the put on the shelf of the article or product. In this way the consumer can quickly relate the residual life of the article, or its price, or any of the variable represented to that extent.

Figure 6:
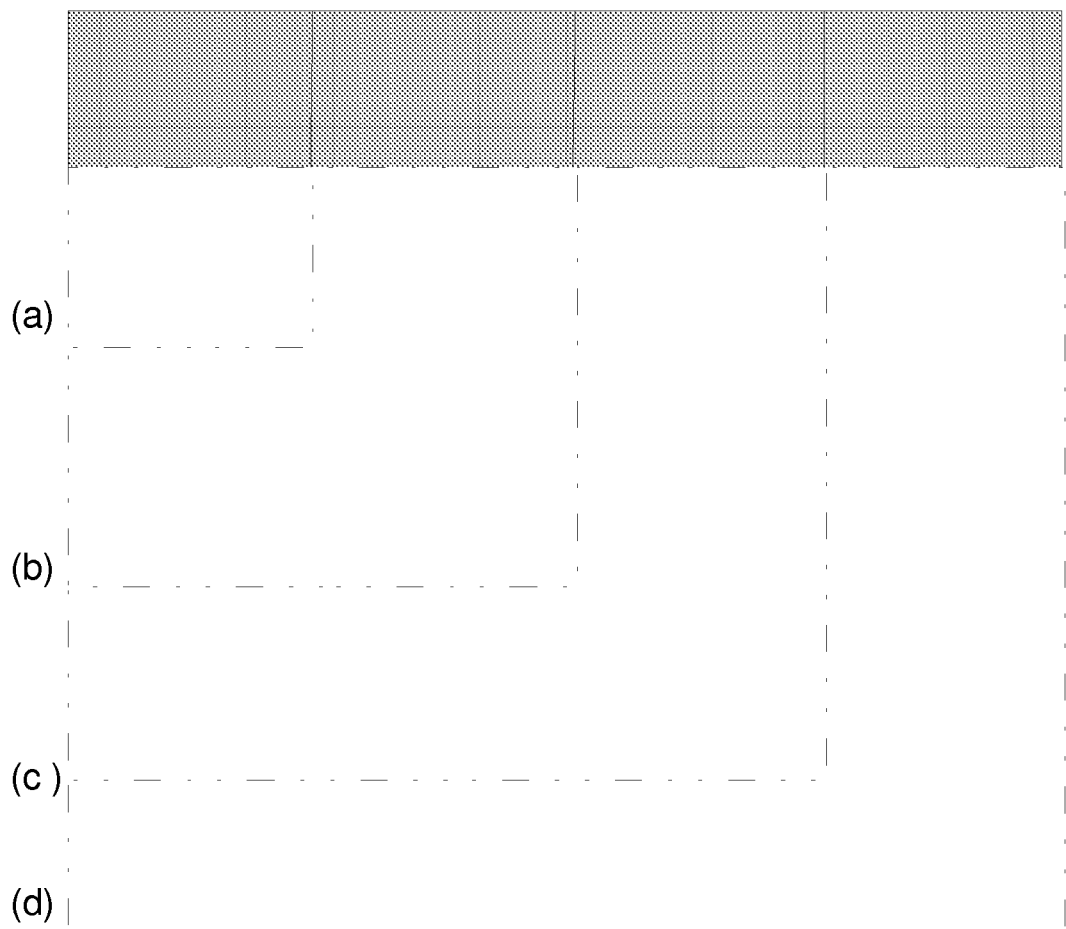
FIG. 6 is a pictorial representation of the TIME VARIABLE portion of the barcode label of the present invention. The label is subdivided in four segments corresponding respectively to intervals of freshness comprised between 100-75% (d), 74-50% (c), 49-25% (b), 24-0% (a). It is clear and obvious that the number of intervals in which the label is subdivided can be changes as required by the convenience of the user. The gray area represents a generic label, whose segments darken out with the passing of the time. Each segment has a different pre set time to allow oxygen into the layer containing the color changing chemical ultimately resulting in different darkening times for each segment. So that they progressively change color in a neat and clean way, readable by a scanner.

Optical scanners can only detect a substantial color contrast such as black and white and relate that into an electric signal that ultimately is transformed into numbers and manipulated by a software program. Because of that is critical that the distinction between dark and clear remains as marked and neat as possible. To achieve that as shown in FIGS. 6 and 7 the TVB of the present invention is internally subdivided into a plurality of areas physically separated one from the other one. In FIG. 6 said areas are pointed out with the letters (a), (b), (c), and (d).

The areas are such that the subsequent only begin changing its color once the preceding has totally and fully changed its color, assuring in this way a clear reading. For example, with reference to FIG. 6 area (b) begins only discoloring after area (a) it's fully discolored. In this way the scanner has a clear reading on area (a). To simplify the drawings FIG. 6 only shows four areas, but this process is designed to be scaled down to subdivide the TVB into a substantial number of areas so that they become inperceptible to the human eye. The color change depends on the combination used of color changing chemical and gas present in the atmosphere.

The differential in color changing is obtained by setting up a differential filter system as shown in FIG. 7. The color changing chemical is generally a redox indicator such as an hydroquinone compound, that may react with various atmospheric components including molecular oxygen or other gases present in the atmosphere. The TIME VARIABLE component of the present invention is set up so that a filter system allows for oxygen to reach different areas of the layer containing the color changing chemical at different times. Filters are materials that is selectively permeable to certain molecules and that can control the time taken by oxygen molecules, for example, to reach the layer impregnated with the color changing chemical. Selectively permeable filters include but are not limited to molecular sieves such as aluminosilicate glasses, clays, porous glasses, microporous characoals, zeolites, liquefied zeolites, and active carbons, or other synthetic compounds functional to that effect.

Said selectively permeable molecular filters can be arranged in a parallel fashion such as in FIG. 7(*a*), where the time that oxygen, or other gases present in the atmosphere, take to reach the bottom layer is basically controlled by the density or the quality of the filter. Alternatively the filter system can be set up in a layered structure such as the one described in FIG. 7(*b*) where the time taken by oxygen to reach the bottom layer is ruled by the thickness of the filter layer.

For the purpose of the present application TIME INVARIABLE and the correlated shelf life refers to the use of the management system in a way that does not rely or depend on the changes on a time sensitive label, rather it depends on the expiration date set in the system. For example is a merchant display a set of clothing to the public and link their identifying barcode in a database, then he can link their identifying barcodes to an expiration date. In the case of clothing it can be the season, for example for winter clothing the merchant can associate their expiration date with the oncoming spring at the passing of the expiration date the CPU of running the TMS will alert the merchant that the clothing are out of season, or out of fashion and that must be withdrawn from display. In the case of the TIME INVARIABLE the shelf life it's NOT determined by the freshness or the nutritional content of the article or product but rather by chosen parameters related to time such as season, fashion, and others.

A further example of a situation where time and time changes are critical is the fashion business. Season determine the usage, the value, and the sellability of clothes items. After a certain period of exposure the season change and other may have to be taken away from the display area or put into a special sale to eliminate the residual inventory. The TMS in its TIME INVARIABLE embodiment disclosed in the present invention provides the technology to perform either operation with limited resources. If the merchant also want to be notified of that a specific amount of time lapsed after the put on display of certain merchandise, then the information is stored into the database and after the expiration of the pre-set date the merchant is notified either visually, electronically, automatically, or acoustically.

Historically bar codes have been used in retail stores, grocery stores, and stores open to the public at large to tag and manage inventories. Under the teaching of the present invention, in one of its preferred embodiment the printed indicia displayed on the variable label represent a bar code. The barcode can be linear, and compatible with the Universal Product Code (U.P.C.) and or with the Global Standard (GS-1). In various other preferred embodiments the variable printed indicia displayed on the label of the present invention are either a 2D matrix bar code, or a 3 D compatible three dimensional bar code in which case a portion of said bar code physically.

US published application 20030235119 and U.S. Pat. No. 7,808,861 to Abraham Wien disclose a multi layers indicator is put together to indicate the expiration of a product. Broadly speaking the multi layers technology involves the use of an external protective layer, a dissolvable gel, and a layer of chemical compounds that change color when they get in touch with a gas present in the atmosphere. Under the teachings of the Wien disclosures said detectors include but are not limited to hydroquinone (1,4 benzendiol) compounds such as, diphenol compounds, 2-methyl-1,4-dihydroxybenzene, 2,5-dimethyl-1,4Dihydroxybenzene, 2,6-dimethyl-1-4-dihydroxybenzene, 2,3,5-trimethyl-1,4-dihydroxybenzene, 2-ethyl-1-4-dihydroxybenzene, 2-t-buthyl-1-4-dihydroxybenzene, 2,5-di-t-butyl-1-4-dihydroxybenzene, 1,4 dihydroxynaphtalene, 2-methyl-1-4-dihydroxynaphtalene, and others. Other technologies may be integrated with the variable labels of the present invention depending on the industry's needs.

The Wien invention discloses that a time expiration system can be achieved by combining water, a neutralizer, a source of oxygen, and a hydroquinone compound. When the time expiration system is activated an oxygen containing gas is allowed to get in contact with the other components of the system, ultimately oxidizing the hydroquinone compound that thus changes color indicating that the product is expired. A gel in interposed between the oxygen source and the hydroquinone in an amount calibrated to allow the oxygen to reach the hydroquinone in a predetermined lapse of time. Other details are described in the Wien invention that is hereby incorporated by reference in the present application.

The special label disclosed in the instant invention improves on the Wien commonly own patent and patent application in the sense that make use of barcode technology to integrate the TIME VALUE BAR into a TIME MANAGEMENT SYSTEM of broad application. Some of the same components of the Wien patents are assembled to display information that vary with time in a way that is both (a) clear to the public, and (b) encoded or readable by a scanner like apparatus. At the time an article is exposed to air the variable bar code shows a full display, over time fractions of the bar code cancel out erasing or displaying a solid color that destroys the printed indicia therefore creating and leaving a new or altered set of information that is displayed visually or in an encoded fashion such as a scanneable barcode. This reduced portion reflects the diminished shelf life, and contains coded and or clearly displayed information regarding the article. As shelf life diminishes the price of the article is diminished accordingly at discretion of the store manager. In the present invention the special variable bar code label is designed to change over time since the beginning of its usage and they are calibrated to change at different lapses of time since the beginning of their usage.

For the purpose of the present application activation time is defined the time at which the label of the present invention is first exposed to atmospheric gases. That is the label is first produced intact and covered with an impermeable protective layer (not shown in the drawings). At the time of the exposure to the air of the label the impermeable protective layer is removed and the label is activated. This time may or may not coincide with the product to which the label is associated entering into the stream of commerce.

In one of the preferred embodiment of the present invention the information is displayed as printed indicia. Printed indicia is referred to the information that is displayed on the external portion of the TMS of the present invention. The information can be coded or clearly legible. When it is clearly legible it is displayed for the convenience of the public. When it is coded it is retrievable with scanning technology. In various separate embodiment of the present invention encoded information is displayed via commercially used bar codes, such as U.P.C. GS-1, EAN, 2-D bar codes, 3-D bar codes. In a sense adding time as an additional variable almost add one additional dimension to the barcodes effectively making an n-D barcode a (n+1)-D barcode. For example a 3-D barcode it becomes a 4-D barcode when the time sensitive component disclosed in the present invention is added.

As shown in FIG. 11 the time variable label of the present invention generally requires for proper functioning: an adhesive layer (1); B) a first structural layer (2); a printable layer (3); a set of indicia printed on said printable layer (not shown in FIG. 11 but pictorially represented in other figures); a chemicals embedded layer composed by absorbent material (4) ; a color changing chemical, embedded in said chemical embedded layer (not shown in FIG. 11 but pictorially represented in other figures); a permeable (filter) layer (5); a sealant layer (6); a reactive chemical present in the air (7) such as an atmospheric gas.

The VARIABLE TIME component of the special label disclosed in the present application is activated by removing said sealant layer (6). Over time the chemical present in the air passes through the permeable layer thus reaching the color changing chemical embedded in the subsequent layer. As the chemical reacts with the air it changes color ultimately changing the display of the printed indicia on the label. The display of printed indicia is progressively canceled out by the change in color of said color changing chemical because of the reaction of the color changing chemical with the chemical present in the air. Said permeable layer is designed to allow a certain amount of chemical present in the air to get in contact with said color changing chemical at a certain pre-set rate to allow for color changes in a timeframe comprised between one day and ten years.

There are several reactive gases in air such as molecular oxygen, carbon oxides including carbon monoxide and carbon dioxide, nitrogen oxides, pH affecting chemicals, oxidizing and reducing chemicals, and so on. The rate of change of the display of the printed indicia is pre-set and calibrated so that it corresponds to the freshness of the product to which it is associated. The beginning display representing the highest degree of freshness, the final display representing the end of the shelf life of the item. The time period set for the discoloration may change between one day and ten years.

According to the teachings of the present application the information displayed on said variable bar code label is scanned via an optical scanner, retrieving the information associated with the encoded bar code via a computer system. The information are initially entered manually or electronically via INPUT devices such as keyboards, mouse, optical scanners, and the like, into a data base that stores and associate them with a certain bar code via a software program. At the scanning of the bar code are retrieved and can be converted into a user friendly format, and subsequently manipulated as needed. For example they can be used to determine whether a product is safe to use or not or which price is most appropriate for a product that has a certain percentage of residual shelf life only.

As it can be seen from the drawings the variable bar code label of the present invention is associated both to basic information related to an article such as the article's identity and to variable features such as freshness, residual shelf life, nutritional values, price, percentage of active chemicals as it relates to time, and so on. The variable bar code label is segmented and each segment fades away, or discolor after a certain period of time varying between two days and two years. As a portion of the variable bar codes discolor the information displayed changes so for example when the percentage of residual shelf life of an item is diminished the merchant has the option to reduce the sale price. In one of the preferred embodiments of the present invention said variable encoded printed indicia are displayed in a form that is understandable by the general public.

The TMS of the present invention also requires the use of physical components including but not limited to of at least one variable label displaying graphically encoded printed indicia uniquely related to a specific item, said label including an invariable component and a variable component, a Central Processing Unit (CPU), a plurality of INPUT devices, a plurality of OUTPUT devices, a plurality of connections to link the CPU to said INPUT and OUTPUT devices, a first Database associated to said CPU, a second Database associated to said CPU, a computer software program to manage the information. INPUT devices are collectively referred as those devices that are used to INPUT information into the data bases and include keyboard, mouse, scanners, optical cameras, and the like. OUTPUT devices are in fact devices that are used to bring the information out of the data base and include monitors, printers, smartphones, cash register, and the like. In one of the preferred embodiments of the present invention some or all of the connections that links the CPU to said INPUT and OUTPUT devices are wireless.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A label for delivering information regarding an item, the label comprising:
   a common base member;
   two separate components, including a first component and a second component, displayed simultaneously on said common base member;
   said common base member having an adhesive surface to be attached to the item and a display surface supporting said two separate components on display;

said first component being a time invariable component displaying a first set of printed indicia that does not change over time;

said second component being a time variable component, containing:
- a printable layer;
- a second set of printed indicia printed on said printable layer;
- a chemicals embedded layer composed of an absorbent material embedding a color changing compound selected from the group consisting of organic color changing compounds, inorganic color changing compounds, and their combinations;
- a permeable layer internally subdivided into a plurality of areas physically separated one from the other one; and
- a sealant layer;

said two separate components being assembled such that said printable layer lays on said common base member, and said sealant layer is exposed to open air.

2. The label according to claim 1, wherein said first set of printed indicia displayed on said time invariable component is a barcode selected from the group consisting of a linear barcode, a matrix barcode, and a three dimensional barcode.

3. The label according claim 2, wherein said barcode is a G.S.-1 linear barcode U.P.C. compliant.

4. The label according to claim 1, wherein said second set of printed indicia impressed on said printable layer of said time variable component display information that is clear an observer to read and understand.

5. The label according to claim 1, wherein said second set of printed indicia impressed on said printable layer of said time variable component display information that is encoded.

6. The label according to claim 1, wherein said color changing compound is hydroquinone or a compound deriving from or containing the quinone and hydroquinone functional groups.

7. The label according to claim 1, wherein said second set of printed indicia impressed on said printable layer of said time variable component is progressively canceled out by a change in color caused by a reaction of said color changing compound with an atmospheric component comprises molecular oxygen, an oxide of nitrogen, or an oxide of carbon.

8. The label according to claim 7, wherein a chemical present in the air is a chemical that has an effect on pH.

9. The label according to claim 8, wherein said permeable layer allows a certain amount of chemicals present in the air to get in contact with said color changing compound at a certain pre-set rate.

10. The label according to claim 9, wherein said pre-set rate allows for a total discoloration of said barcode in a time interval comprised between one day and ten years.

11. The label according to claim 1, wherein said permeable layer is a zeolite based molecular sieve.

12. The label according to claim 1, wherein said oxide of carbon is selected from the group consisting of carbon monoxide and carbon dioxide.

13. A time management system associated with a product, the time management system comprising:
- a label for delivering information regarding the product, the label containing a common base member, two separate components, including a first component and a second component, that does change over time, displayed simultaneously on said common base member, said common base member having an adhesive surface to be attached to the product and a display surface supporting said two separate components on display, said first component being a time invariable component displaying a first set of printed indicia that does not change over time, said second component being a time variable component, containing: a printable layer, a second set of printed indicia printed on said printable layer, a chemicals embedded layer composed of an absorbent material embedding and a color changing compound selected from the group consisting of organic color changing compounds, inorganic color changing compounds and their combination, a permeable layer internally subdivided into a plurality of areas physically separated one from the other one, and a sealant layer, said two separate components being assembled such that said printable layer lays on said common base member, and said sealant layer is exposed to open air;
- a central processing unit (CPU);
- a plurality of input devices;
- a plurality of output devices;
- a plurality of connections to link said CPU to said input and output devices;
- a first database coupled to said CPU;
- a second database coupled to said CPU; and
- a computer software program to manage the information.

14. The time management system according to claim 13, wherein said plurality of connections to link said input and output devices is wireless.

15. The time management system according to claim 13, wherein said input devices are selected from the group consisting of keyboards, mice, and optical scanners.

16. The time management system according to claim 13, wherein said output devices are selected from the group consisting of monitors, printers, smart phones, and cash registers.

* * * * *